(12) United States Patent　　(10) Patent No.:　　US 9,320,383 B2
　　Sands　　　　　　　　　　　　　　(45) Date of Patent:　　Apr. 26, 2016

(54) FRENCH PRESS BLENDER

(71) Applicant: HOMELAND HOUSEWARES, LLC, Los Angeles, CA (US)

(72) Inventor: Lenny Sands, Los Angeles, CA (US)

(73) Assignee: Capbran Holdings, LLC, Los Angeles, CA (US)

( * ) Notice: Subject to any disclaimer, the term of this patent is extended or adjusted under 35 U.S.C. 154(b) by 73 days.

(21) Appl. No.: 14/231,978

(22) Filed: Apr. 1, 2014

(65) Prior Publication Data

US 2015/0272378 A1　　Oct. 1, 2015

(51) Int. Cl.
*A47J 31/42*　　(2006.01)
*A47J 31/20*　　(2006.01)
*A47J 31/00*　　(2006.01)
*A47J 31/06*　　(2006.01)
*A47J 31/44*　　(2006.01)

(52) U.S. Cl.
CPC ............... *A47J 31/42* (2013.01); *A47J 31/005* (2013.01); *A47J 31/06* (2013.01); *A47J 31/20* (2013.01); *A47J 31/44* (2013.01)

(58) Field of Classification Search
CPC ......... A47J 31/005; A47J 31/06; A47J 31/20; A47J 31/42; A47J 31/44; A23F 3/18; A23F 5/262
See application file for complete search history.

(56) References Cited

U.S. PATENT DOCUMENTS

| 2,413,687 | A | * | 1/1947 | Bogoslowsky | ............... | 426/433 |
| 2,900,896 | A | | 8/1959 | Bondanini | | |
| 5,635,233 | A | | 6/1997 | Levinson | | |
| 5,800,852 | A | | 9/1998 | Levinson | | |
| 6,817,750 | B1 | | 11/2004 | Sands | | |
| 7,040,218 | B1 | * | 5/2006 | Biolchini, Jr. | .................. | 99/297 |
| 7,066,640 | B2 | | 6/2006 | Sands | | |
| 7,422,632 | B2 | | 9/2008 | Sands | | |
| 2008/0148956 | A1 | * | 6/2008 | Maurer | ........................... | 99/287 |
| 2010/0294135 | A1 | * | 11/2010 | Weissman et al. | .............. | 99/287 |
| 2013/0284030 | A1 | | 10/2013 | Katz | | |

* cited by examiner

*Primary Examiner* — Anthony Weier
(74) *Attorney, Agent, or Firm* — Trojan Law Offices

(57) ABSTRACT

The invention is directed to a French press combination grinder, filter, and drinking vessel, and method of making coffee. The system has a motor base, a container body, and two selectively removable container bases. The first removable container base has a blade, and the second removable container base has a plunger and filtering unit. Coffee beans are placed in the container body and ground when the first selectively removable container base is attached to the container body. Then, after the coffee is ground, the first base is removed and hot water is poured into the container body. The user then attaches the second container base and depresses the filtering unit to separate the coffee slurry into a liquid portion on top and coffee grounds portion on the bottom. The user may then drink the coffee directly from the same container that ground and filtered the coffee beans.

9 Claims, 6 Drawing Sheets

FRENCH PRESS BLENDER

CROSS REFERENCE TO RELATED APPLICATIONS

None

FIELD OF THE INVENTION

The present invention relates to system for grinding, brewing, and filtering beverages in a single container. In particular, the device is a combination of a blender and a French press for making coffee, tea or other beverages.

BACKGROUND OF THE INVENTION

Typically, to prepare coffee using a French press, also called a press pot or coffee press, multiple receptacles are used during the process. First, the coffee is ground in a one receptacle using a grinding instrument until the coffee beans are in a coarse ground state. Then the coffee grounds are transferred from the grinding receptacle into a different receptacle for steeping, often a type of beaker. Hot water is added to the beaker and the coffee grounds are stirred for a brief period of time. The coffee grounds steep in the hot water, creating a coffee slurry. After steeping, the user places a fitted cover over the beaker top. This cover is outfitted with a plunger and filter unit. The user depresses the plunger, which moves the filter from the top of the beaker to the bottom of the beaker, thereby trapping the solid coffee grounds of the slurry at the bottom of the beaker and leaving the drinkable liquid coffee portion on top. The user can then transfer the drinkable portion to another receptacle for drinking, and discards the coffee slurry left in the beaker. Although French presses are typically used for coffee, they are also used to create other beverages such as teas.

French presses are well known in the art, and there have been a wide variety of types of French presses and methods of using French presses to brew coffee and tea. In one example, U.S. Pat. No. 5,635,233, "Methods for Preparing a Coffee, Tea or Milk Beverage," Levinson teaches separating the plunger-strainer of the French press coffee maker into a plunger member and a contiguous filter member. In another example, U.S. Pat. No. 5,800,852, "A Coffee/Tea, Table Blender and Microwave Oven Apparatus and methods for Its Use," Levinson also teaches a user to combine the utility of a conventional blender and microwave oven to make coffee. U.S. patent application Ser. No. 13/980,165, "French Press Coffee Maker with Spent Grounds Removal," teaches another example of device and method to remove coffee grounds from a French press container. However, these devices and others still require the transfer of coffee grounds from one container to another. The prior art reveals that multiple devices are needed in order to grind, brew, filter, and drink coffee. The need for multiple devices devices to get from whole coffee beans to a drinkable beverage makes it cumbersome for a coffee drinker to quickly prepare a freshly brewed cup of coffee.

Therefore, there remains a need for simplified devices and methods to grind, brew, and filter coffee.

SUMMARY OF THE INVENTION

The invention relates to a beverage making system having a motor base and single container body used for grinding, brewing, and filtering coffee. The container makes use of two removable bases that are adapted to be placed and sealed over the opening of the container body. The first base has a blade, which is used for grinding the coffee. The second base has a plunger and filtering unit, which is used for filtering the coffee in the same container body used for grinding and steeping the coffee. The advantage of the present invention over other French presses is that a single container body is used to grind, steep, and filter the coffee. The same container body can also be used to as the coffee mug to drink the final coffee product. No other device or system in the prior art has combined coffee grinder, brewer, filterer, and drinking vessel all into one device.

In one object of the invention, the beverage making system has a motor base with a recessed well positioned at the top of the motor base, and a container assembly. The container assembly has a container body with an open top on one end and a closed bottom on the other end. The container assembly has a first selectively removable container base having a blade. This container base is sized to fit both within the recessed well of the motor base and to seal the open top of the container body. The container assembly also has a second selectively removable container base. This base has a plunging member and filtering unit. The second selectively removable container base is also sized to seal the open top of the container body.

Another object of the invention is a method for preparing a beverage. The method has the steps of using the beverage making system described above. The user selects the beverage making system, places a coffee beans into the container body, attaches the bladed container base to the container body, places the container body and container base into the recessed well of the motor base, and energizes the motor base to activate movement of the blade to grind the beans. After the coffee beans are ground, the user detaches the first container base from the container body and adds a liquid (such as hot water) to fill the container body in order to steep the beverage. A second container base having a plunger and filter unit base is then attached to the same container body that has the steeped beverage. The user then depresses a plunging member so that a filtering unit moves down the cavity of the container body. The plunging member traps the coffee grounds or tea leaves at the bottom portion of the container body, leaving the liquid drinkable portion of the slurry at the top portion of the container.

In one embodiment, the plunger has a rod and a knob at the top of the rod that can be temporarily locked into the container base having the plunger and filter unit. The knob may be locked in a position that is substantially flush with the container base. The container base may also have a drinking hole so that the user can easily drink the beverage directly from the container body even when the second container base is attached to the container body. In this embodiment, the second container base is used both for plunging and filtering, as well as serving as the lid of a coffee mug.

While the foregoing describes the present invention in relation to illustrations and examples, it is understood that it is not intended to limit the scope of the invention to the illustrations and examples described herein. On the contrary, it is intended to cover all alternative modifications and equivalents that may be included in the spirit and the scope of the invention as defined by the appended claims. All publications, patent applications, and patents mentioned herein are incorporated by reference in their entirety. In the case of conflict, the present specification, including definitions, will control.

BRIEF DESCRIPTION OF THE DRAWINGS

The advantages of the invention will be described and understood from the following detailed description of the preferred embodiments of the invention, the same being illustrated in the accompanying drawings.

DETAILED DESCRIPTION OF THE INVENTION

The detailed description set forth below in connection with the appended drawings is intended as a description of exemplary embodiments and is not intended to represent the only forms in which the exemplary embodiments may be constructed and/or utilized.

Figure 1:
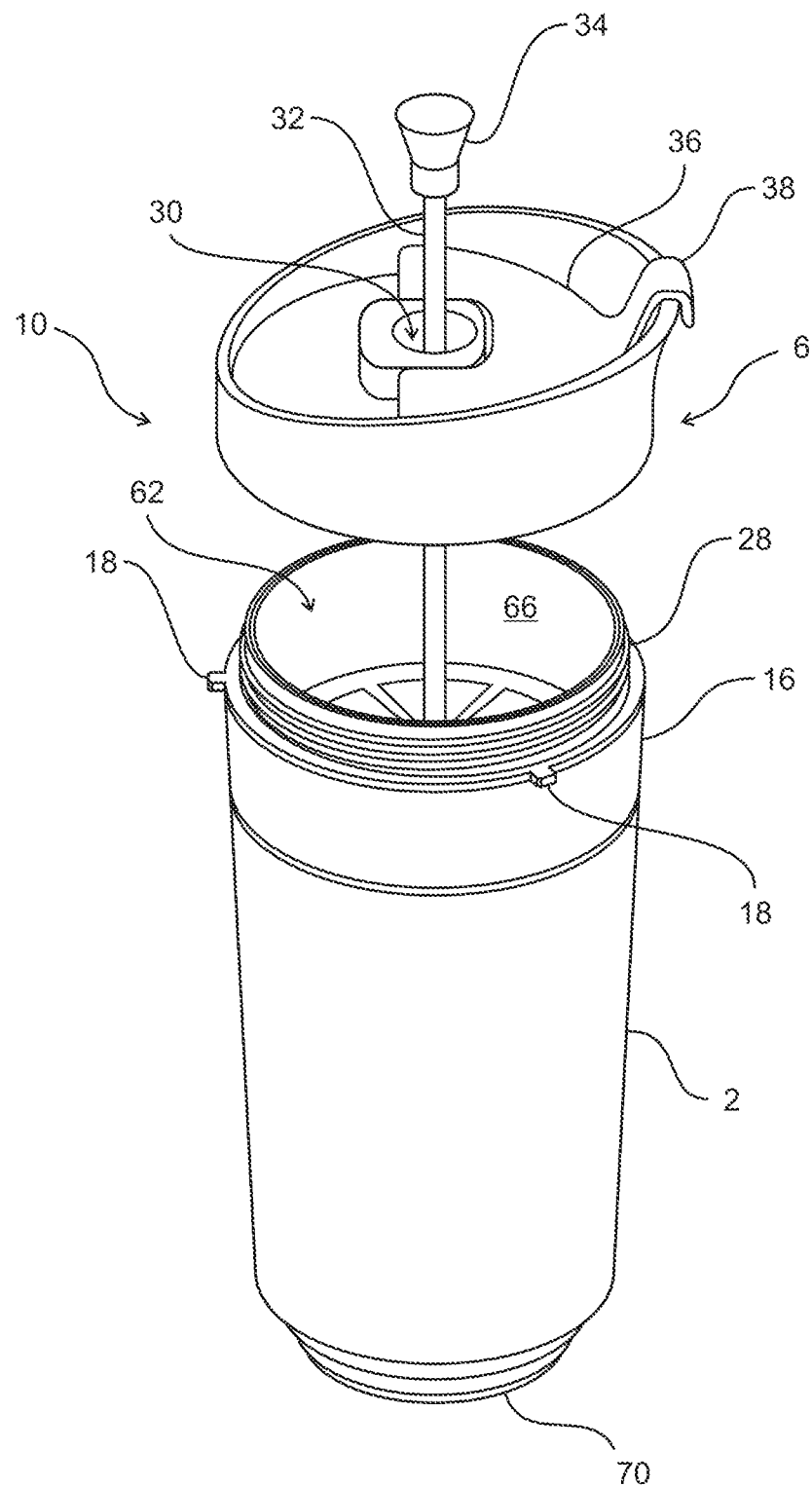
FIG. 1 is a perspective view of French press container body and detached container base having a plunger and filtering unit.
Figure 2:
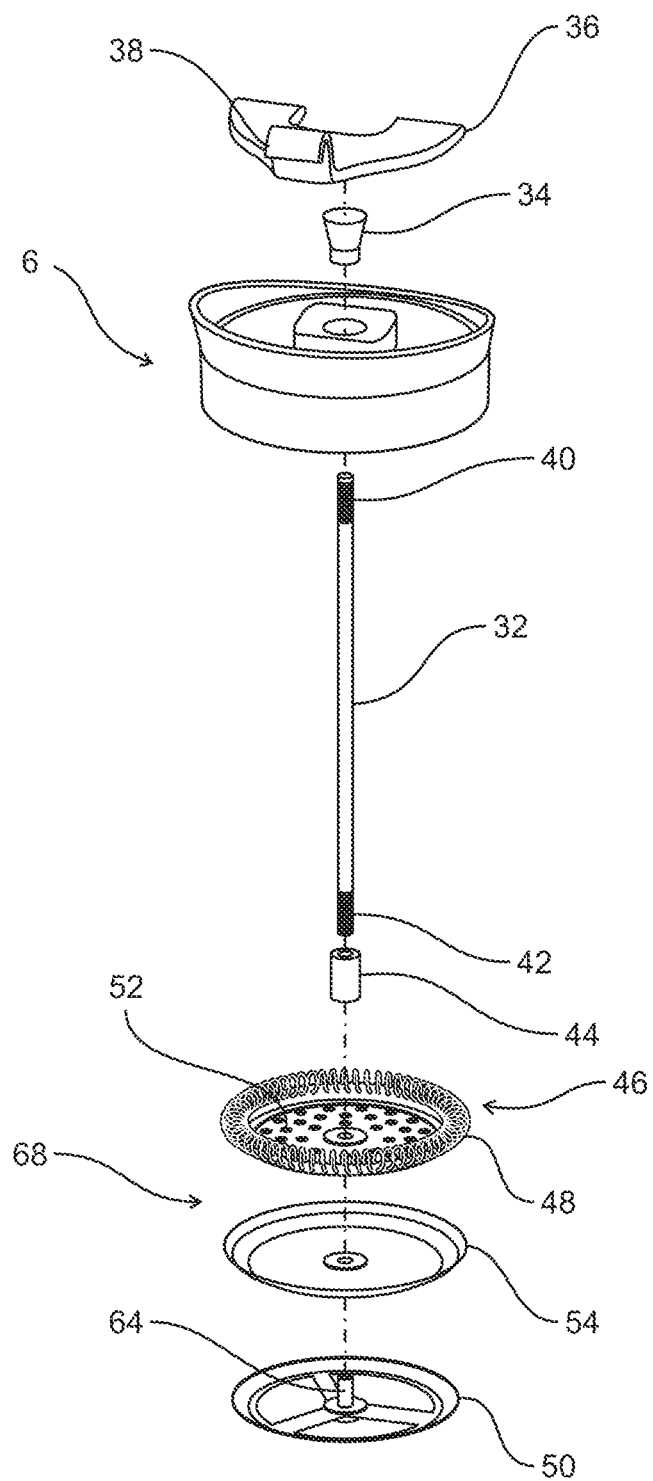
FIG. 2 is an exploded view of a container base having a plunger and filtering unit.
Figure 3:
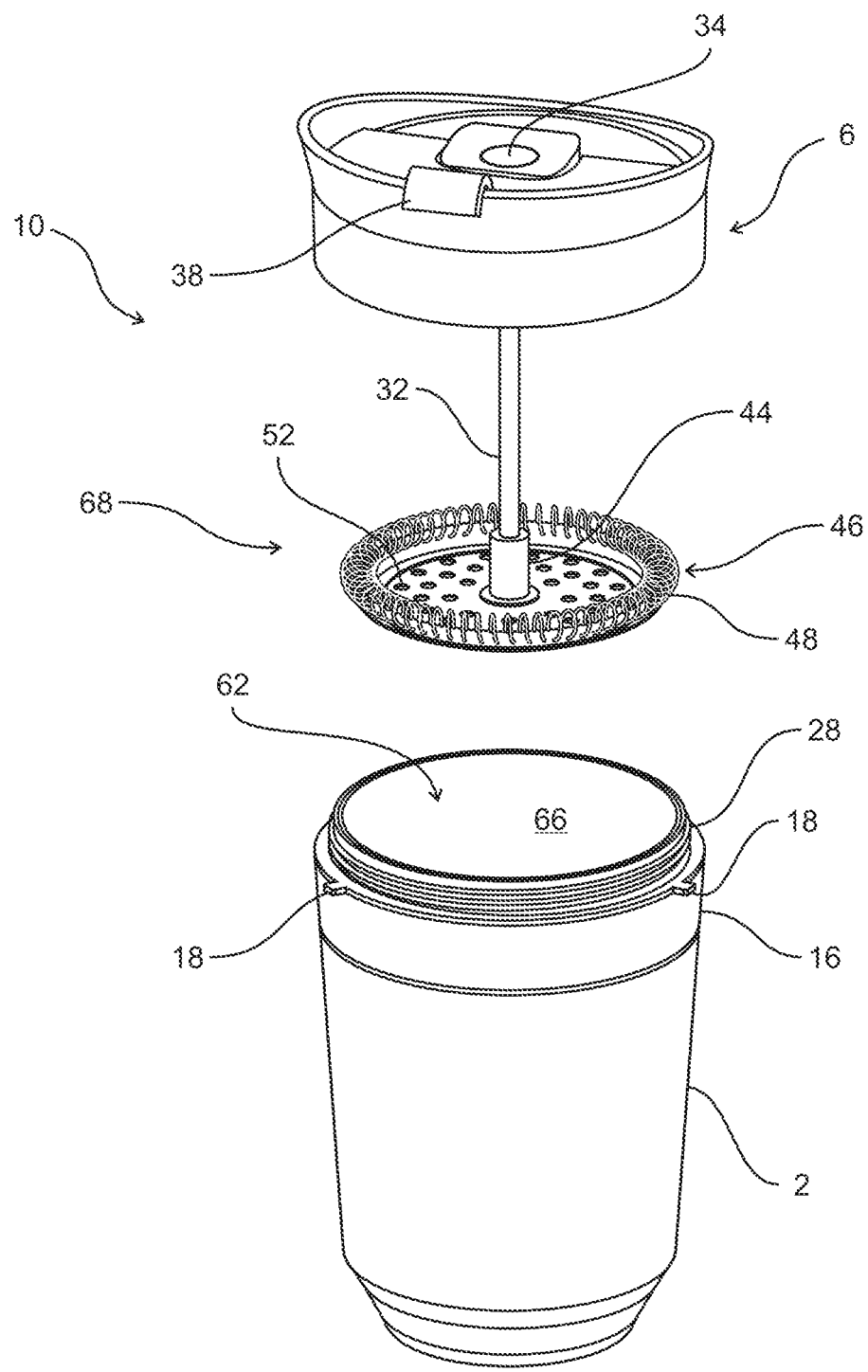
FIG. 3 is a perspective view of a French press container body and container base having a plunger and filtering unit separated from the container body.

Turning to the drawings, FIG. 1 is directed to an exemplary embodiment of a beverage making system, illustrated as an individualized French press blender assembly 10. The container body 2 can be fitted with a first selectively removable container base 4 (illustrated separately in FIG. 4) or a second selectively removable container base 6, as illustrated in FIGS. 1-3. As shown in the embodiment of FIG. 1, the container body 2 is substantially cylindrically shaped and has an open top 62 at one end and a closed bottom 70 at the other end opposite the open top 62. As those skilled in the art will appreciate, the container body may be any number of sizes or shapes known or developed in the art.

Selectively removable bases in blenders are known in the art. Examples of removable bases are found in are U.S. Pat. No. 7,066,640, entitled, "Blender and Mugs," and U.S. Pat. No. 7,422,362, entitled "Portable Blender."

Here, the purpose of the first selectively removable container base 4 is to grind such as coffee beans, and the purpose of the second container base 6 is to separate and filter the slurry of the ground coffee beans into an upper liquid portion and a lower foodstuff solid grounds. The upper liquid portion has the drinkable liquid with the solid grounds portion separated from the drinkable coffee.

Figure 4:
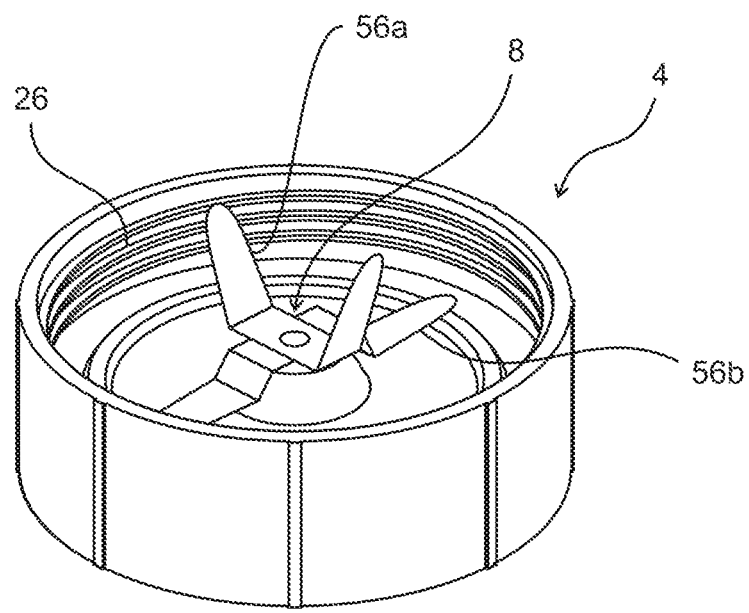
FIG. 4 is a perspective view of a container base having a blade for grinding coffee beans.

FIG. 4 depicts to the first container base 4, and is characterized as having has a grinding unit 8. Container bases with grinding units are well known in the art, such as those taught by U.S. Pat. No. 6,817,750 to Sands. While the grinding unit 8 is illustrated in FIG. 4 as having individual blades 56a, 56b, grinding units having any number of blades would be appreciated by those having ordinary skill in the art. The cutting elements are generally flat members that have sharpened edges, pointed tips, and one or more bends along the surface of the cutting elements. A grinding unit 8 designed for grinding coffee beans would be especially useful in the present invention. Grinding units 8 without blades may also be used in the as long as the grinding unit has the means to break apart coffee beans into course grounds.

Figure 5:
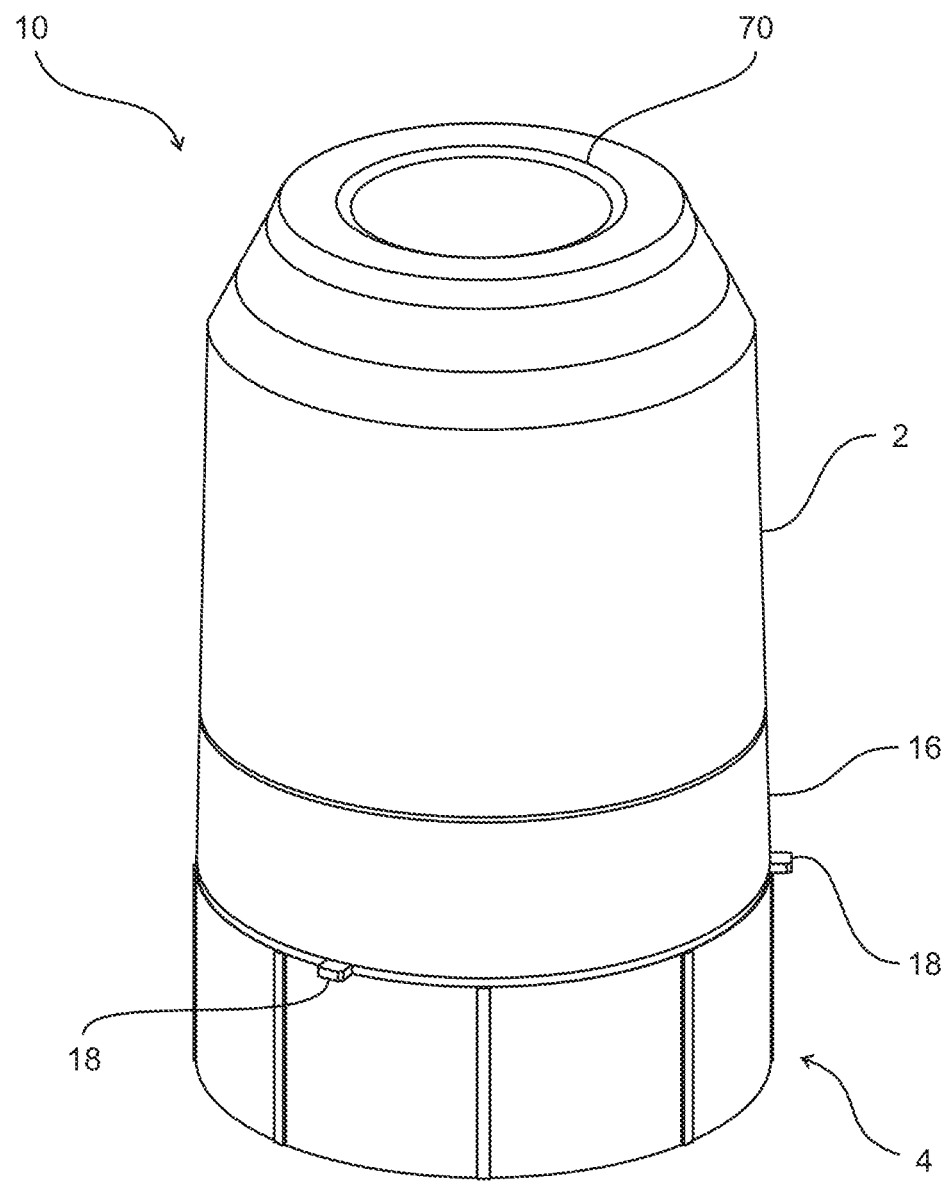
FIG. 5 is a perspective view of an assembled container body with the container base of FIG. 4.

Before attaching the first container base 4 to the container body 2, coffee beans are placed within the cavity 66 of the container body 2. The first container base 4 is adapted to be attached to the container body 2, and can be attached through any number of means. In the embodiment of FIG. 4, the means of attachment of the first container base 4 to the container body 2 is an inner threading 26 along the base's inner periphery. These threads 26 allow the first container base 4 to securely attach to the container body 2. In some embodiments the container base 4 may be directly attached to the container body 2, or in other embodiments the container base 4 may be attached to a coupling ring 16 situated between the container body 2 and the first container base 4. The coupling ring 16 may be a cylindrically shaped member that allows the drinking vessel to have various additional elements, such as a handle fir the container. FIG. 5 illustrates the container body 2, coupling ring 16, and first container base 4 connected together such that the assembly of the container base 4 and container body 2 can be placed onto a motor base 14 to grind the coffee.

Figure 6:
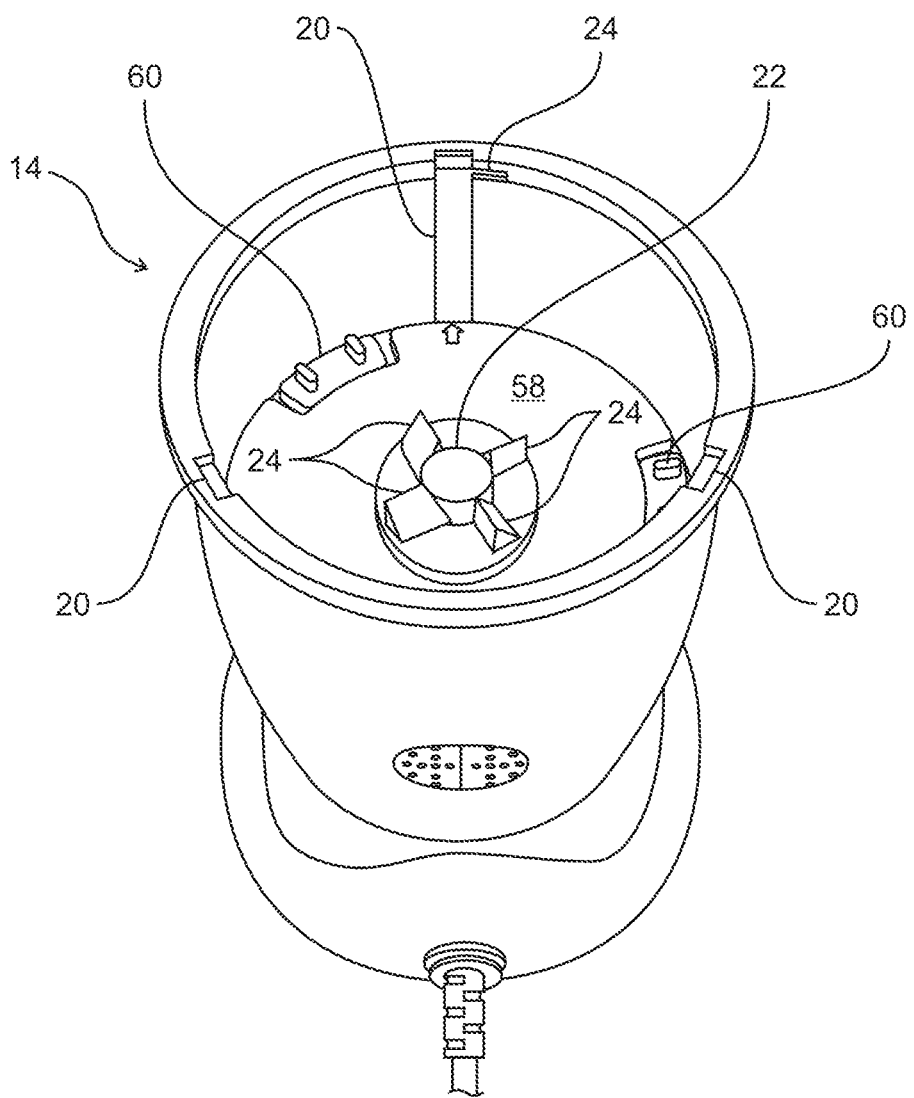
FIG. 6 is a perspective view of a motor base for placement of the container body and container base of FIG. 4 and FIG. 5.

A motor base 14 is illustrated in FIG. 6, but it will be appreciated that any motor base has the means to activate the grinding unit 8 could be used. FIG. 6 depicts one embodiment of a motor base 14 and the various components that are associated with the base's recessed well 58. The base 14 includes a motor unit (not shown) that is coupled to an impeller 22. As will be appreciated by those having skill in the art, the inner workings of the motor unit 12 can be any number of types of motor units, such as the motor unit described in U.S. Pat. No. 6,817,750, When the motor is activated, an impeller 22 rotates and causes the grinding unit 8 to rotate, thereby grinding, blending, or crushing the contents in the container body 2.

The impeller 22 includes a plurality of blades 24 that radiate from the center of the impeller 22. Along the periphery of the recessed well 58, a plurality of bushings 60 may be placed. In another exemplary embodiment, the base 14 may not include bushings 60. The bushings 60 may be made from a generally resilient material such as, but not limited to, rubber or silicone that may serve to reduce vibrations when the motor is spinning To activate the motor, the base may include one or more pressure activated switches 20. The container may be pressed down to activate the motor and rotated slightly so as to allow locking members 18 to engage in locking grooves 26, so as to permit continued operation of the motor without requiring the user to exert constant pressure to keep the motor powered. Alternatively, the motor base 14 does not have to have locking grooves, and the container body 2, or coupling ring 16, does not have to have a locking member 18. In these alternative embodiments, the container can be activated either by pressing down on the container continuously until the coffee is ground to the user's preference, or the motor base may be activated by a switch, knob, or other mechanism that turns the motor off and on, independent of any pressure exerted by the user.

The beverage making system also includes a second container base 6 that is adapted to attach to the same container body 2 to which the first container base 4 attaches. Both container bases 4, 6 may have inner threads 26 as a means to attach the base 4, 6 to threads 28 on the outer periphery of the container body 2. As those skilled in the art will appreciate, the bases 4, 6 may be secured to the container 2 directly or indirectly by various known and developed means, such as, but not limited to, a friction fit, a snap fit, or any other suitable type of attachment means.

After the coffee is ground using the first container base 4, the user removes the first base 4, pours hot water into the cavity 66 of the container body 2 to allow the coffee to steep in the cavity 66. To filter the coffee, the user attaches the second selectively removable base 6 to the container body 2. The second container base 6 is outfitted to perform as the French press unit of the beverage making system. When the coffee has steeped sufficiently, the user depresses the knob 34 from its raised position to a lower position. The knob 34 is attached to the upper region of the rod 32 via an upper threading 40, which secures the knob 34 to the rod 32. As the knob 34 is pressed down, the entire filtering unit 68 attached to the rod 32 moves down the cavity 66 of the container body, allowing the liquid portion of the coffee to pass through the filtering unit 68, The coffee ground slurry is trapped in the lower portion of the cavity 66 beneath the filtering unit 68, thereby preventing the user from drinking coffee grounds.

The filtering units described above are well known in the art, such as the filter unit taught by Bondanini in U.S. Pat. No. 2,900,896. It will be appreciated that any number of embodiments of filtering units used in French presses may be used. In the present embodiment, as depicted in FIGS. 2 and 3, the filtering unit 68 comprises a filter plate illustrated as a spiral plate 46, a filter screen 54, and a filter fixing plate, depicted as a crossplate 50. The spiral plate 46 has a series of metal coils 48 that press against the inner periphery of the container body 2, creating a vertically movable fitted seal along a cross section of the cavity 66 of the container body 2. The fitted seal prevents coffee grounds in the lower portion of the container from passing through the filtering unit 68 to the liquid portion of the beverage. The spiral plate 46 may also have a plurality of plate holes 52 that allow passage of the liquid portion of the coffee slurry from below the spiral plate 46 to above the spiral plate 46.

Beneath the spiral plate 46 is the filter screen 54, which is a porous material (such as filter paper or a metal filter screen) that allows liquids, but not solids to pass through the screen. Filtering screens are commonly known in the art, and a variety of filtering screens may be use in the present invention that allow passage of liquid, but not solids to traverse the screen 54. The filtering screen 54 is sandwiched between the spiral plate 46 on top and the crossplate 50 on the bottom. The crossplate 50 and spiral plate 46 keep the filtering screen 46 in place along the cross-section of cavity 66 of the container body 2. To connect the filtering unit 68 and the plunging rod 32, a rod attachment member 44 is disposed on top of the spiral plate 46 and threaded to a lower threading 42 on the lower region of the rod 32. The rod attachment member 44 is depicted as a hollow cylinder, but can be any shape that allows for securing of the rod 32 to the filter unit 68. In one example, as shown in FIG. 2, the crossplate 50 has a central axis protrusion 64 that is capable of insertion through the centers of the filter screen 54 and spiral plate 46, and attaches to the rod attachment member 44.

The top of the second container base 6 may have various coffee mug features that allow the user to easily drink out of the container. For example, the second container base 6 may have a rotatable flap 36 that covers a drinking hole on the lid. The flap 36 may be secured to the second container base 6 via a locking member 38 to keep the flap 36 closed during transport, or just to prevent coffee from spilling. In some embodiments, the knob 32 may be positioned in the piston rod receptacle 30, thereby allowing the user to drink coffee without having a protruding knob in the way.

The invention has been described in terms of preferred embodiments thereof, but is more broadly applicable as will be understood by those skilled in the art. The scope of the invention is only limited by the scope of the following claims and equivalents thereof.

I claim:

1. A beverage making system, comprising:
    i) a motor base having a recessed well positioned at the top of the motor base;
    ii) a container assembly having a container body and an open top on one end of the container body;
    iii) a first selectively removable container base having a blade, the first selectively removable container base sized to fit into the recessed well of the motor base, and sized to seal the open top of the container body; and,
    iv) a second selectively removable container base having a plunging member and a filtering unit, said second selectively removable container base sized to seal the open top of the container body;
    wherein the open top of the container body is designed to be to alternatively, but not simultaneously sealed by the first selectively removable container base and the second selectively removable container base;
    whereby alternatively engaging the first and second selectively removable container bases with the container body allow a user to both grind coffee beans and filter coffee without transferring coffee beans out of the container body after grinding and before filtering.

2. The beverage making system of claim 1 wherein said plunging member comprises a rod and a knob attached to the rod.

3. The beverage making system of claim 2, where said second selectively removable container base comprises a rod opening, through which the rod extends, and wherein said rod opening is smaller than said knob, thereby preventing said knob from traversing said second selectively removable container base when said knob is attached to said rod.

4. The beverage making system of claim 1, further comprising a coupling ring adapted for attaching said container body to said first selectively removable container base and said second removable container base.

5. The beverage making system of claim 1, wherein said first and second selectively removable container bases each comprise a threaded region along an inner periphery for attachment to said container body.

6. The beverage making system of claim 1, wherein a motor unit is enclosed within said base.

7. The beverage making system of claim 1, wherein said filtering unit comprises a filtering screen sandwiched between a filtering plate and a fixing plate.

8. The beverage making system of claim 7, wherein said filtering plate comprises metal coils and said fixing plate is a crossplate.

9. A beverage making system, comprising:
    i) a motor base having a recessed well positioned at the top of the motor base, and a motor unit enclosed within said motor base;
    ii) a container assembly having a container body and an open top on one end of the container body;
    iii) a first selectively removable container base having a blade, the first selectively removable container base sized to fit into the recessed well of the motor base, and sized to seal the open top of the container body,
    iv) a second selectively removable container base having i) a plunging member having a rod and knob, ii) a filtering unit having a filtering plate, a filtering screen, and a fixing plate attached to said rod, iii) a rod opening through which the rod extends, said second selectively removable container base sized to seal the open top of the container body; and
    v) a coupling ring adapted to alternatively attach said container body with said first selectively removable container base and said second selectively removable container base,
    wherein the open top of the container body is designed to be to alternatively, but not simultaneously sealed by the first selectively removable container base and the second selectively removable container base.

\* \* \* \* \*